(12) United States Patent
Longshaw (10) Patent No.: US 7,194,456 B2
(45) Date of Patent: Mar. 20, 2007

(54) METHOD OF QUERYING A STRUCTURE OF COMPRESSED DATA

(75) Inventor: Thomas Benjamin Longshaw, Worcester (GB)

(73) Assignee: Qinetiq Limited (GB)

( * ) Notice: Subject to any disclaimer, the term of this patent is extended or adjusted under 35 U.S.C. 154(b) by 346 days.

(21) Appl. No.: 10/250,469

(22) PCT Filed: Dec. 18, 2001

(86) PCT No.: PCT/GB01/05627

§ 371 (c)(1),
(2), (4) Date: Jul. 2, 2003

(87) PCT Pub. No.: WO02/063498

PCT Pub. Date: Aug. 15, 2002

(65) Prior Publication Data

US 2004/0107184 A1    Jun. 3, 2004

(30) Foreign Application Priority Data

Jan. 6, 2001    (GB) ................................ 0100331.8

(51) Int. Cl.
*G06F 17/30* (2006.01)
(52) U.S. Cl. ........................................................ 707/3
(58) Field of Classification Search ................ 707/1, 707/2, 10, 200, 3; 715/853
See application file for complete search history.

(56) References Cited

U.S. PATENT DOCUMENTS

| | | | |
|---|---|---|---|
| 5,245,337 A | 9/1993 | Bugajski et al. | |
| 5,293,164 A | 3/1994 | Bugajski et al. | |
| 5,546,575 A | 8/1996 | Potter et al. | |
| 5,592,667 A | 1/1997 | Bugajski | |
| 6,006,232 A | 12/1999 | Lyons | |
| 6,415,279 B1 * | 7/2002 | Gard et al. | 707/2 |
| 6,559,871 B1 * | 5/2003 | Brozowski et al. | 715/853 |

FOREIGN PATENT DOCUMENTS

| | | |
|---|---|---|
| EP | 0 79 465 | 5/1983 |
| WO | WO 95/17783 | 12/1994 |

OTHER PUBLICATIONS

Pucheral et al., "Efficient Main Memory Data Management Using the DBGraph Storage Model", *Proceedings of the 16th Very Large Data Bases Conference*, pp. 683-695 (1990).
Missikoff, "A Domain Based Internal Schema for Relational Database Machines", *Proceedings of the 1982 ACM SIGMOD Conference*, pp. 215-224 (1982).
Missikoff et al., "Relational Queries in a Domain Based DBMS", *Proceedings of the 1983 ACM SIGMOD Conference*, pp. 219-227 (1983).
Desphande, "An Implementation for Nested Relational Databases", *Proceedings of the 14th VLDB Conference*, pp. 76-87 (1988).
Harder, "Datenbanksysteme: Konzepte und Techniken der Implementierung", pp. 143-175 (1999).
Search Report from the European Patent Office for Application No. PCT/GB01/05627.

* cited by examiner

*Primary Examiner*—Etienne P. LeRoux
(74) *Attorney, Agent, or Firm*—McDonnell Boehnen Hulbert & Berghoff LLP (57) ABSTRACT

A method of querying a structure of compressed data comprising records stored as a forest of binary includes the step of generating an instruction set allowing a specified data value with a binary tree to be retrieved, given input of an address in memory that identifies the binary tree. Further querying functions which utilise the instruction set allow selection of records on the basis of one or more specified data values, or ranges of data values, statistical analysis of records and grouping of records on the basis of common data values within fields of records.

9 Claims, 8 Drawing Sheets

| 10 | Manufacturer | Year | Usage | Premium |
|---|---|---|---|---|
| 0 | Ford | 1994 | Fleet | 400 |
| 1 | Ford | 1996 | Private | 300 |
| 2 | Audi | 1996 | Fleet | 400 |

Fig.1.

|   | Manufacturer | Year | Usage | Premium |
|---|---|---|---|---|
| 0 | Ford | 1994 | Fleet | 400 |
| 1 | Ford | 1996 | Private | 300 |
| 2 | Audi | 1996 | Fleet | 400 |

| Address | Contents |
|---|---|
| 100420 | 144204 |
| 100424 | 156960 |
| 100428 | 144212 |
| 100432 | 156968 |
| 100436 | 144220 |
| 100440 | 156960 |

| | |
|---|---|
| 144204 | 242552 |
| 144208 | 242568 |
| 144212 | 242552 |
| 144216 | 242572 |
| 144220 | 242260 |
| 144224 | 242572 |

| | |
|---|---|
| 156960 | 242576 |
| 156964 | 242592 |
| 156968 | 242584 |
| 156972 | 242596 |

| | |
|---|---|
| 242552 | Ford |
| 242556 | Ø |
| 242560 | Audi |
| 242564 | Ø |
| 242568 | 1994 |
| 242572 | 1996 |
| 242576 | Flee |
| 242580 | tØØØ |
| 242584 | Priv |
| 242588 | ateØ |
| 242592 | 400 |
| 242596 | 300 |

METHOD OF QUERYING A STRUCTURE OF COMPRESSED DATA

The invention relates to structures of compressed data, and particularly, although not exclusively, to compressed databases, and methods and computer software for querying compressed databases.

Storing records in a computer system to form an electronic database is a well-known technique. Commercially available database software allows records to be stored within a computer system's memory and allows stored records satisfying one or more search criteria to be recovered and displayed.

Frequently, databases are required to store large numbers of records. For example, a database holding details of people or vehicles may be required to store a number of records on the order of $10^7$. In order to reduce the amount of memory needed to store such large numbers of records, and hence provide for more efficient use of available memory, it is generally desirable to arrange for compression of input data comprising records to be stored. Data compression is typically achieved by storing only single instances of particular data, i.e. by removing redundant data from the input data. The unique instances of data within the input data are stored as a compressed data structure within memory that provides for complete reconstruction of the input data. An example of a system for storing a structure of compressed data is disclosed in U.S. Pat. Nos. 5,245,337, 5,293,164 and 5,592,667. The system includes a series of processors each of which has an associated memory. A body of digital input data is applied serially to a first processor in the series which detects pairs of data elements in the input data which have not occurred previously and stores them in a first associated memory. An output signal from the first processor identifies each data pair's storage location in the first associated memory. Subsequent processors operate on signals representing storage locations in memory and not actual data. Each processor generates a single location in memory corresponding to a pair of input data elements input to it, and stores that pair of data elements at that location. Each processor also determines the number of times that each input pair of data elements has occurred and stores that number at a location in memory associated with that pair. A hashing table created by each processor and stored in its associated memory is used to aggregate stored pairs of data elements into groups to simplify identification of pairs of data elements that have previously been stored. Address pointers stored at memory locations of each pair of data elements link adjacent pairs within the groups in order of occurrence frequency in the input data so that input pairs of data elements may be stored within groups according to probability of occurrence. Another system for compressing data by storing pairs of data elements and associations between them is disclosed in published international application PCT/NZ94/00146 (international publication number WO 95/17783).

Although these systems are able to exactly reconstruct an input data stream from the compressed data structure, they provide no means for selecting groups of data elements on the basis of one or more search criteria, as is required in a database.

It is an object of the invention to provide an alternative method for searching an electronic database using at least one search criterion.

The present invention provides a method of querying a data structure which comprises a plurality of records, each record comprising a plurality of nodes structured as a binary tree, wherein the method comprises the operation of creating an instruction set for accessing a data value stored at a leaf node of the binary tree by the steps of:
(a) determining the leaf node's position address within a binary tree to which the node belongs;
(b) establishing the leaf node's lateral position index; and
(c) entering an instruction in an instruction set, the instruction depending on the node's lateral position index.

The invention provides the advantage that a structure of compressed data may be queried more quickly than has previously been possible.

Preferably, the method further comprises the step of retrieving a data value stored at a leaf node of a binary tree using the instruction set and the binary tree's root node position address. Data values corresponding to the instruction set may thus be retrieved; providing a basis for more sophisticated searching of the database.

The method may further comprise the steps of:
(a) specifying a binary tree;
(b) specifying an instruction set;
(c) reading a data value stored within the binary tree at a node position address corresponding to the instruction set;
(d) adding the data value to a list in memory with a count of one if it has not previously been found within a binary tree or alternatively advancing a count variable in the list associated with that data value by one if the data value has previously been found within a binary tree; and
(e) repeating steps (a) to (d) for remaining binary trees in the data structure.

This determines the set of all possible values of a particular field and the frequencies with which those values appear in the database.

The method may further comprise the steps of
(a) creating a table in memory for each data value in the list;
(b) reading a data value of a binary tree, the data value corresponding to the specified instruction set; and
(c) assigning the binary tree's root node address to a table depending on the data value corresponding to the specified instruction set; and
(d) repeating steps (b) and (c) for remaining binary trees in the data structure.

This enables root node addresses to be grouped by data value of a specified field within records corresponding to the root node addresses.

The method may further comprise the steps of
(a) specifying an order for the data values in the list; and
(b) arranging the tables in an order corresponding to the order of the data values.

This enables all records in the database to be output in a series of groups, each group consisting of all records in which a specified field contains a specified data value.

In order that the invention might be more fully understood, embodiments thereof will now be described by way of example only with reference to the accompanying drawings in which.

Figure 1:
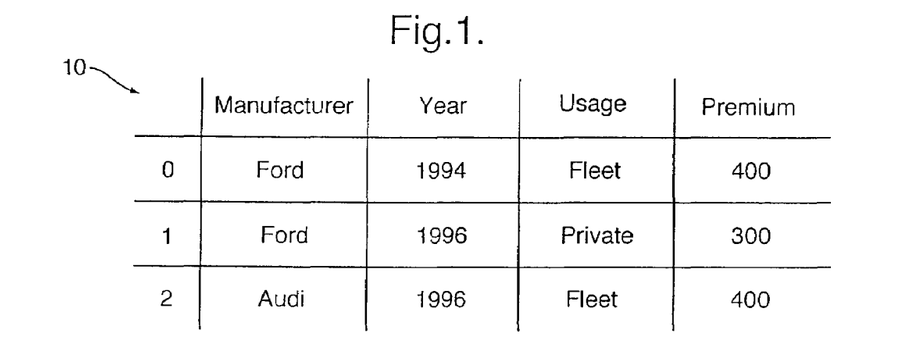
FIG. 1 shows a table of records forming a database.

Referring to FIG. 1 there is shown a table 10 comprising example data that might be input to a database maintained by a motor insurance company. The table comprises three records which specify particulars of an insured vehicle. Each record comprises four fields namely a manufacturer field for storing a data value corresponding to the manufacturer of a vehicle, a year field for storing a data value corresponding to the vehicle's year of manufacture, a usage field for storing a data value corresponding to the vehicle's usage, and a premium field for storing a data value corresponding to the insurance premium of the vehicle. Each record has a record index that uniquely identifies that record. The record indices of the records are shown in the first column on the left in the table 10.

Figure 2:
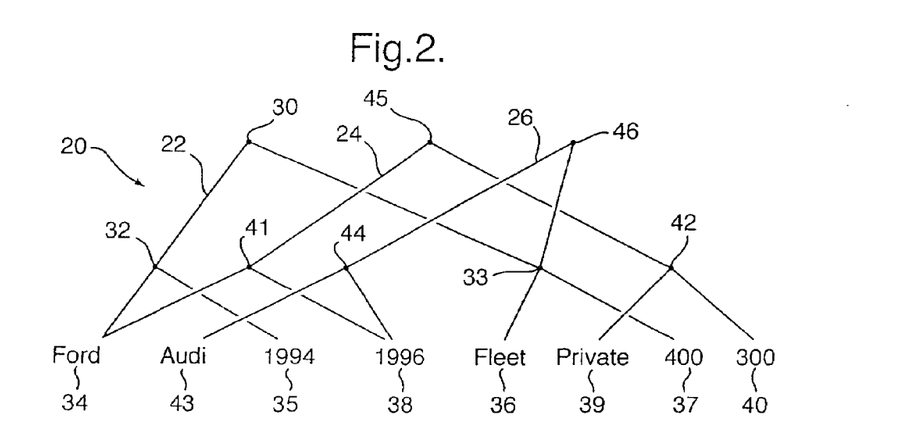
FIG. 2 represents the records of FIG. 1 as a forest of binary trees.

Referring now to FIG. 2 data from the three records shown in the table 10 of FIG. 1 is shown arranged as a forest 20 of binary trees 22, 24, 26 each of which represents a record in the table 10 of FIG. 1. The forest 20 indicates graphically how the records are stored within the memory of a computer on which the database is maintained. A binary tree is a representation of a particular record within memory and comprises a single root node, intermediate nodes and leaf nodes. For example binary tree 22 comprises a root node 30 intermediate nodes 32, 33 and leaf nodes 34, 35, 36, 37. Leaf nodes such as 34, 35, 36, 37 store single instances of data from fields of individual records in the table 10 at specific memory addresses. An intermediate node, such as 32, stores the memory addresses of two leaf nodes at a memory address and a root node, such as 30, stores the addresses of two intermediate nodes at a memory address. Each root node also stores the record index of the record from which it is derived. The forest 20 of binary trees is generated from data within individual fields of the records shown in the table 10 of FIG. 1 as follows. Data from fields of the first record (having index number 0) is represented in memory as a series of four leaf nodes 34, 35, 36, 37. That is, data corresponding to "Ford"®, "1994", "fleet" and "£400" is stored within memory at separate memory addresses. An intermediate node 32 stores addresses of the leaf nodes 34, 35 which represent the data "Ford"® and "1994" respectively. Similarly an intermediate node 33 stores addresses of the leaf nodes 36, 37 which represent the data "fleet" and "£400" respectively. A root node 30 stores the addresses of the two intermediate nodes 32 and 33. The record index of a record corresponding to a given root node may be derived from that root node's address.

Data from the fields of the second record (with index number 1) in the table 10 of FIG. 1 is then input to the forest 20. Data from each field in the second record which has not previously been stored as a leaf node, is stored in the forest 20 as a new leaf node. Therefore new leaf nodes 38, 39, 40 are created to store data elements corresponding to "1996", "private" and "£300". An intermediate node 41 is created to store the memory addresses of the leaf nodes 34 and 38. A new leaf node storing the data "Ford"® is not created as such a leaf node has already been created during input of the first record to the forest 20. An intermediate node 42 is created to store the memory addresses of the leaf nodes 39 and 40. A root node 45 is created to store the addresses of the intermediate nodes 41, 42.

The third record in the table 10 of FIG. 1 (with index number 2) is then input to the forest 20. A single leaf node 43 is created in memory and stores the data "Audi"®. No other new leaf nodes are created as leaf nodes storing the data "1996", "fleet" and "£400 " have already been created. A new intermediate node 44 is created containing the addresses of leaf nodes 43 and 38. A new root node 46 is created which contains the addresses of intermediate nodes 44 and 33. Thus when data from the third record in the table 10 of FIG. 1 is added to the forest 20, only a one new leaf node 43 and one new intermediate node 44 is created.

Data from further records may be added to the forest 20. Each time a new record is input to the forest 20 a new root node is created. If a particular manufacturer/year pair has previously occurred during input of data to the forest 20 an intermediate node will already exist in respect of that pair and the new root node will contain the address of that intermediate node. Similarly if a particular flag/premium pair has previously been input to the forest 20, an intermediate node will already exist in respect of that pair and the new root node will contain the address of that intermediate node. A new intermediate node is created if at least one of the manufacturer and year is unique, and/or if one of the flag and premium is unique. A new leaf node is created only when data from a field of a record has not previously been input to the forest 20. If a record has fields identical to those of a record previously input to the forest 20, a new root node is added to the structure to indicate the presence of a duplicate record. In such a case, the new root node will contain the addresses of two intermediate nodes which already exist.

As the total number of records input to the forest 20 increases, the rate at which the amount of stored data grows decreases until it converges to a minimum growth rate. When this occurs, the amount of data stored in the forest is the product of the number of records in the database and the amount of memory required to store a root node. The forest 20 provides compression of input data by not storing redundant data.

Figure 3:
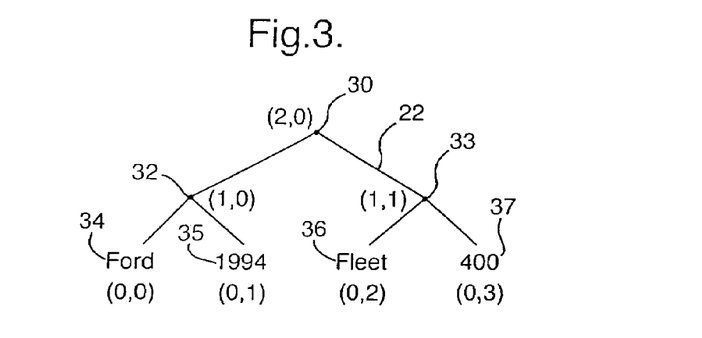
FIG. 3 shows a particular binary tree of the FIG. 2 forest in more detail.

Each node in a binary tree is assigned a node position address which specifies the position of the node in the binary tree to which it belongs. A node position address has a form (n, m) where n is a level index indicating whether the node is a leaf node, an intermediate node or a root node and m is a lateral position index indicating the node's lateral position. Referring now to FIG. 3 the binary tree 22 of FIG. 2 is shown in isolation. Leaf nodes 34, 35, 36, 37 storing the data "Ford", "1994", "fleet" and "£400" respectively have node position addresses (0, 0), (0, 1), (0, 2) and (0, 3) respectively. Intermediate nodes 32, 33 have node position addresses (1, 0) and (1, 1) respectively and the root node 30 has a node position address (2, 0).

Figure 4:
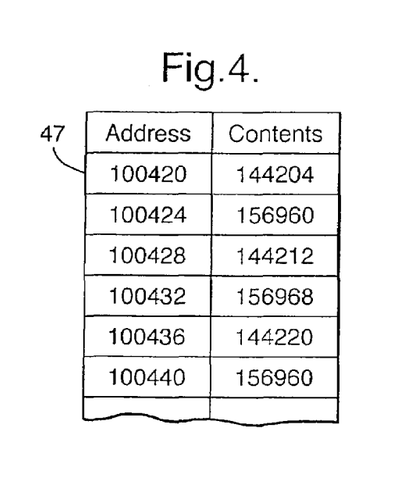
FIGS. 4 to 13 are flow charts illustrating stages in execution of querying algorithms which operate on the FIG. 1 database.
Figure 5:
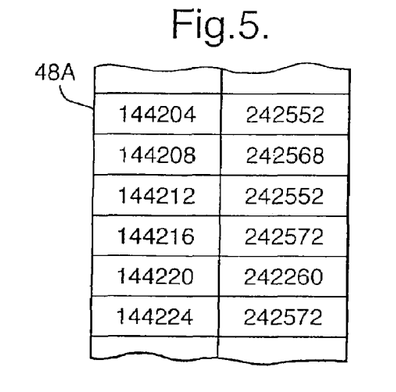
Figure 6:
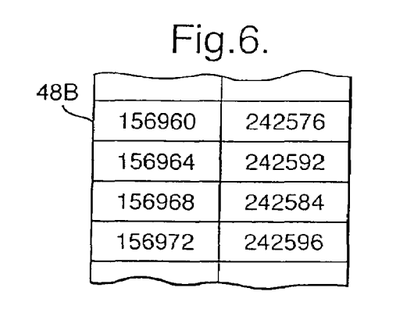
Figure 7:
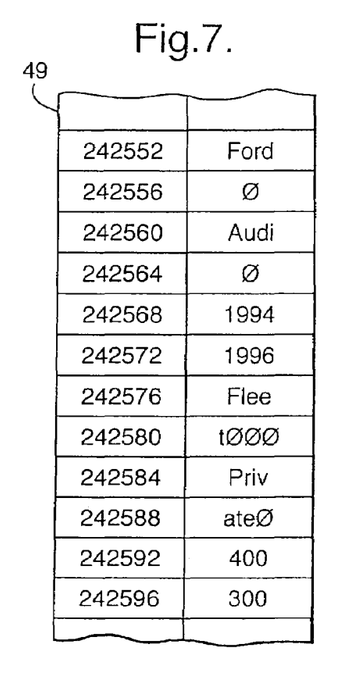

FIGS. 4 to 7 show how data is stored within memory so that the forest 20 of FIG. 2 may be implemented when the database is queried. FIG. 4 shows a portion of a memory block 47 which stores data corresponding to root nodes. FIG. 5 shows a portion of a memory block 48A which stores data corresponding to intermediate nodes which are to the left of root nodes and FIG. 6 shows a portion of a memory block 48B which stores data corresponding intermediate nodes which are to the right of root nodes. FIG. 7 shows a portion of a memory block 49 which stores data corresponding to leaf nodes.

Referring to FIG. 4, address locations 100420, 100424, correspond to the root node 30 of the binary tree 22 of the forest 20 shown in FIG. 2. Address locations 100428, 100432 correspond to the root node 45 of the binary tree 24 and address locations 100436, 100440 correspond to the root node 46 of the binary tree 26.

As an example of how data corresponding to a binary tree is stored within memory, consider binary tree 24 of FIG. 2. The root node 45 of binary tree 24 is represented by address locations 100428 and 100432 of the memory block 47, part of which is shown in FIG. 4. Address location 100428 stores a value 144212, and address location 100432 stores a value 156968. The value 144212 points to a pair of address locations 144212 and 144216 within the memory block 48A, part of which is shown in FIG. 5, and the value 156968 points to a pair of address locations 156968 and 156972 within the memory block 48B, part of which is shown in FIG. 6. That the values 144212 and 156968 point to address locations 144216 and 156972 respectively, in addition to address locations 144212 and 156968 respectively, is implemented by querying algorithms used to interrogate the database which are described in detail below.

Referring to FIG. 5, address locations 144212, 144216 within the memory block 48A correspond to the intermediate node 41 of the binary tree 24, that is, to the intermediate node which is to the left of the root node 45. Referring to FIG. 6, address locations 156968, 156972 within the memory block 48B correspond to the intermediate node 42 of the binary tree 24, that is, to the intermediate node which is to the right of the root node 45.

Address locations 144212, 144216 within the memory block 48A store values 242552 and 242572 respectively. These values are the first of consecutive pairs of address locations within the memory block 49 of FIG. 7 which store data corresponding to leaf nodes 43 and 38 respectively. Similarly address locations 156968, 156972 within the memory block 48B store values 242584 and 242596 respectively, these values being the first of consecutive pairs of address locations within the memory block 49 of FIG. 7 which store data corresponding to the leaf nodes 39 and 40. That a value stored at a particular address location in either of the memory blocks 48A, 48B points to two consecutive address locations in the memory block 49 of FIG. 7, is implemented by querying algorithms used to interrogate the database, which are described in detail below.

Figure 8:
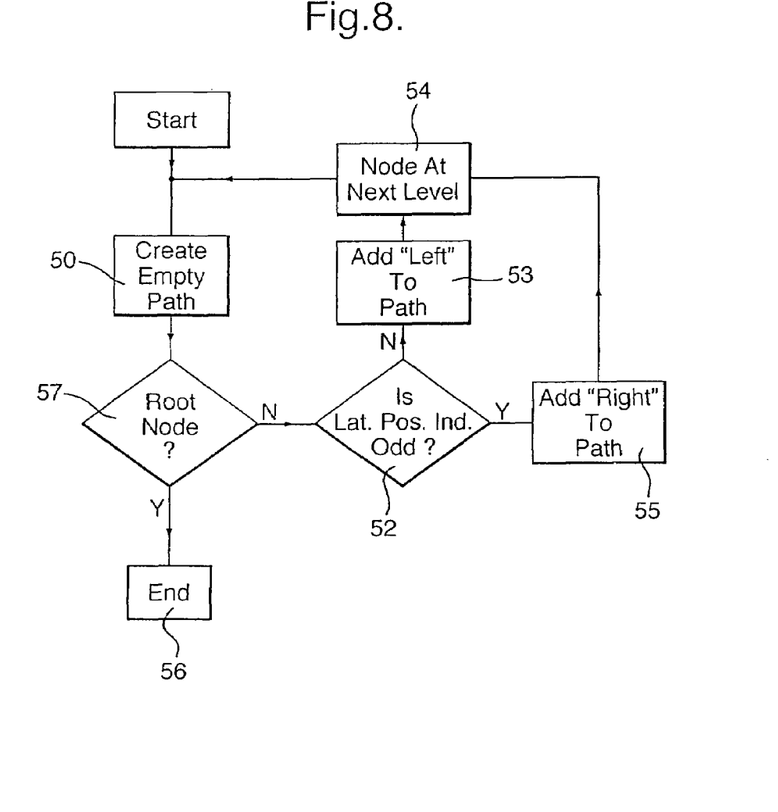

The present embodiment of the invention further comprises utility functions which enable the contents of the database to be queried. One such utility function, which will be referred to as a "path" function returns a data structure called a path. A path allows a binary tree to be navigated from its root node to a particular leaf node of the binary tree. A path is a set of instructions, each of which specifies whether a left or right fork should be taken at a particular intermediate node in order to reach a particular leaf node starting from a root node. Referring again to FIG. 3, the path to the leaf node 36 from the root node 30 is (right, left). Referring now to FIG. 8 there is shown an algorithm for determining the path to a given leaf node. The algorithm operates as follows. An empty path is created (50), i.e. a path containing no instructions. It is then established (51) whether a node under current consideration has a level index indicative of a root node. If the node under current consideration is a root node, the algorithm ends, if not, the lateral index of the node is ascertained (52). If the lateral index is odd, an instruction "right" is entered (55) as the last instruction in the path. If the lateral index is even, and instruction "left" is entered (53) as the last instruction in the path. The node position address of the node which stores the address of the node just considered is then used to establish the penultimate instruction of the path in a like manner (54). The process continues until a roof node is reached (56).

Figure 9:
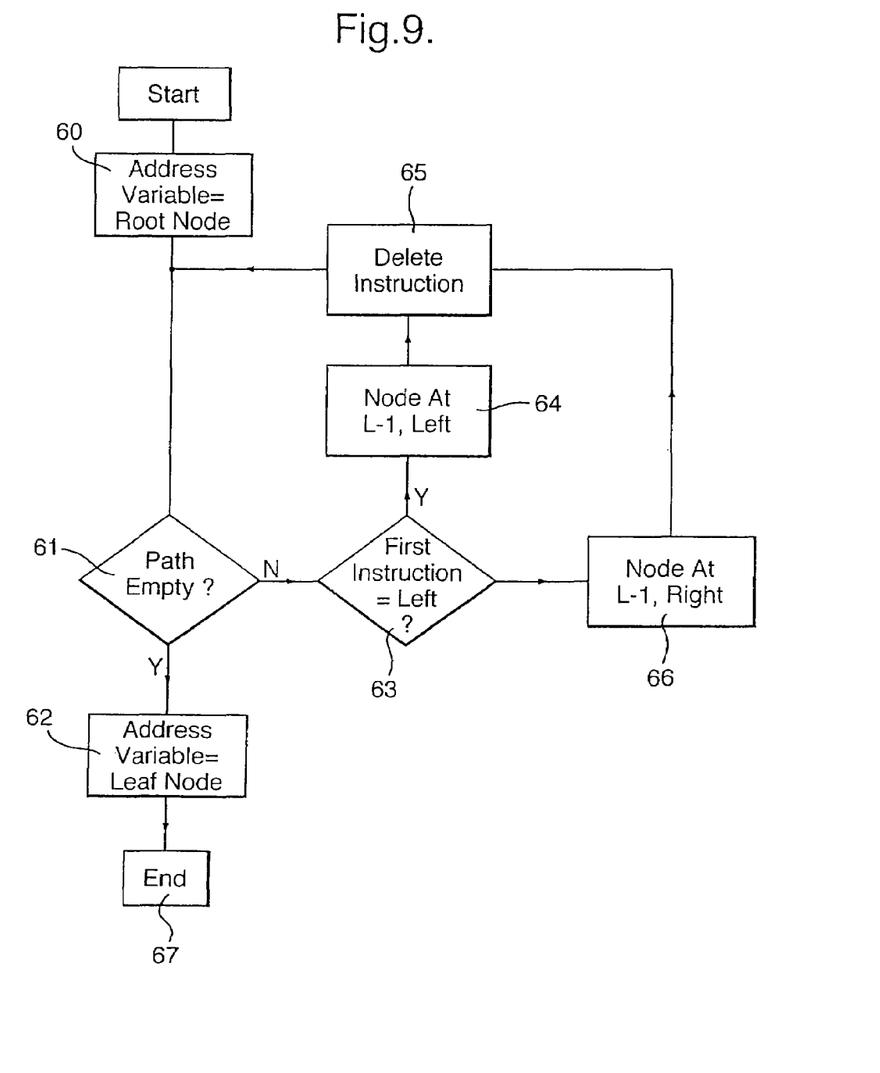

Referring now to FIG. 9, there is shown a flow diagram indicating how a binary tree is navigated from the tree's root node to a leaf node using the path to that leaf node. An address variable is set to the address of the root node (60). It is then ascertained whether the path of the leaf node is empty (61). If the path is empty, the address variable is the same as that of the leaf node (62) and the algorithm ends (67). If the path is not empty, it is established whether or not the first instruction in the path is "left" (63). If it is, the address variable is set to the address of the node which is at level l-1, where l is the level of the root node, and which is to the left of the root node (64). If the the first instruction in the path is "right", the address variable is set to the address of the node which is at level l-1 where l is the level of the root node, and which is to the right of the root node (66). The first instruction in the path is then deleted (65) and the algorithm is repeated until the path is empty. The address of the leaf node specified by the path is then stored as the address variable.

Figure 10:
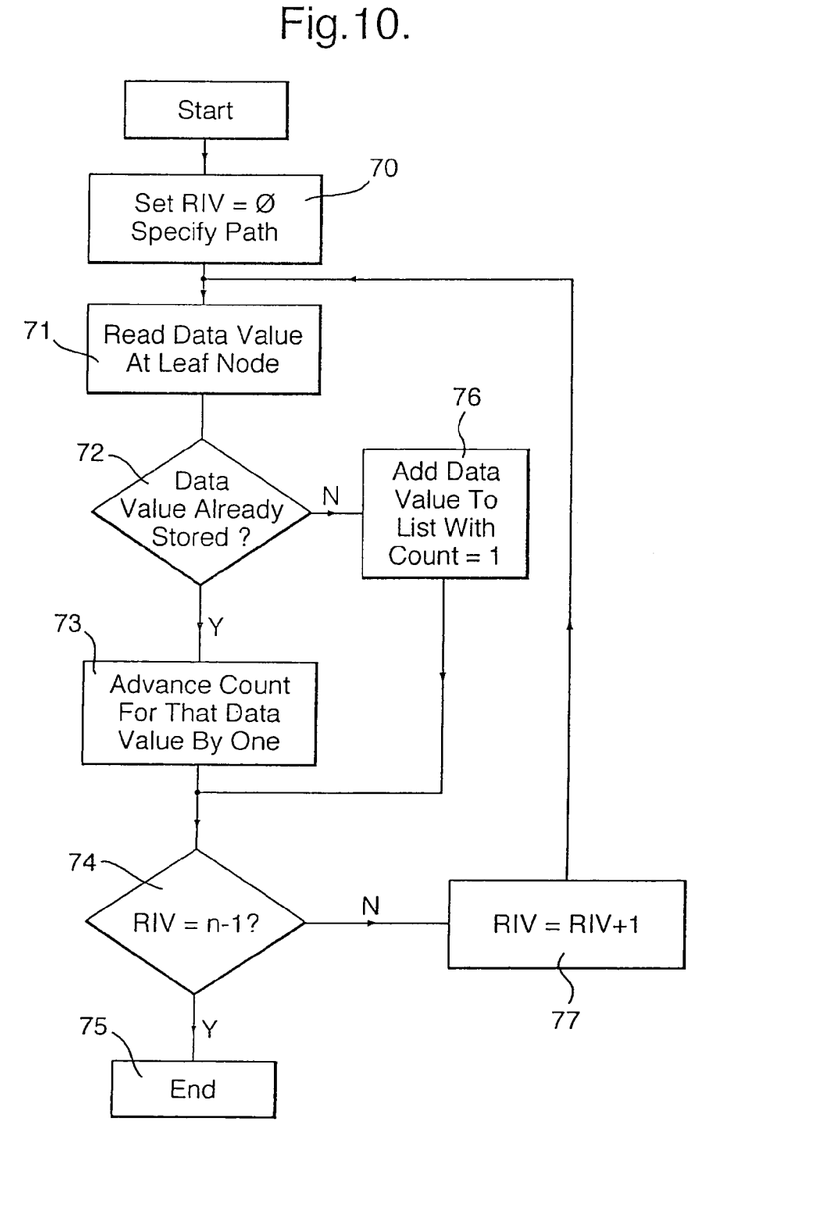

Another utility function of the present embodiment is "set for". The set for function is used to determine the set of all possible values of a field and the frequencies with which those fields appears in the database. For example, referring to the table 10 of FIG. 1 which is stored as the forest 20 of binary trees shown in FIG. 2, it may be required to determine how many cars were made by Ford® and how many by Audi®. Referring now to FIG. 10, there is shown a flow chart of an algorithm for executing the set for function. A record index variable is set to zero in order to specify a first tree in the forest and a path identifying leaf nodes which store data of a required type is specified (70). For example, in the forest 20 shown in FIG. 2, leaf nodes storing manufacturer data each have a node position address (0, 0) and a path (left, left). The data value stored at the leaf node specified by the path and the record index variable is read (71). The data value is added to a list of data values with a count of one (76). If there are no further records in the forest (74); the algorithm ends (75) otherwise the record index value is advanced by one (77) and a leaf node corresponding to the advanced record index variable and the specified path is read. If the data value has previously been entered in the list, the count for that data value within the list is advanced by one (73), otherwise the data value is added to the list with a count of one (76). If the record index variable indicates that the present record is the last in the forest, the algorithm ends (75), otherwise the record index variable is advanced by one and another leaf node is read. After completion of the algorithm shown in FIG. 6, the list contains all data values of the type specified by the path together with counts of how many records contain each data value. Once the enquiry has been made, its results are cached to save further computation. The algorithm of FIG. 10 also enables the number of unique data values associated with a particular field to be determined. This number is equal to the number of entries in the list. The set for function may also be used to calculate sums of fields storing numeric data values. For example, in the database represented in FIGS. 1 and 2, it may be required to calculate the total value of premiums in the database. A list of premiums may be generated as described above, and the total premium calculated using a set of unique premiums and frequencies with which each premium occurs in the database.

Figure 11:
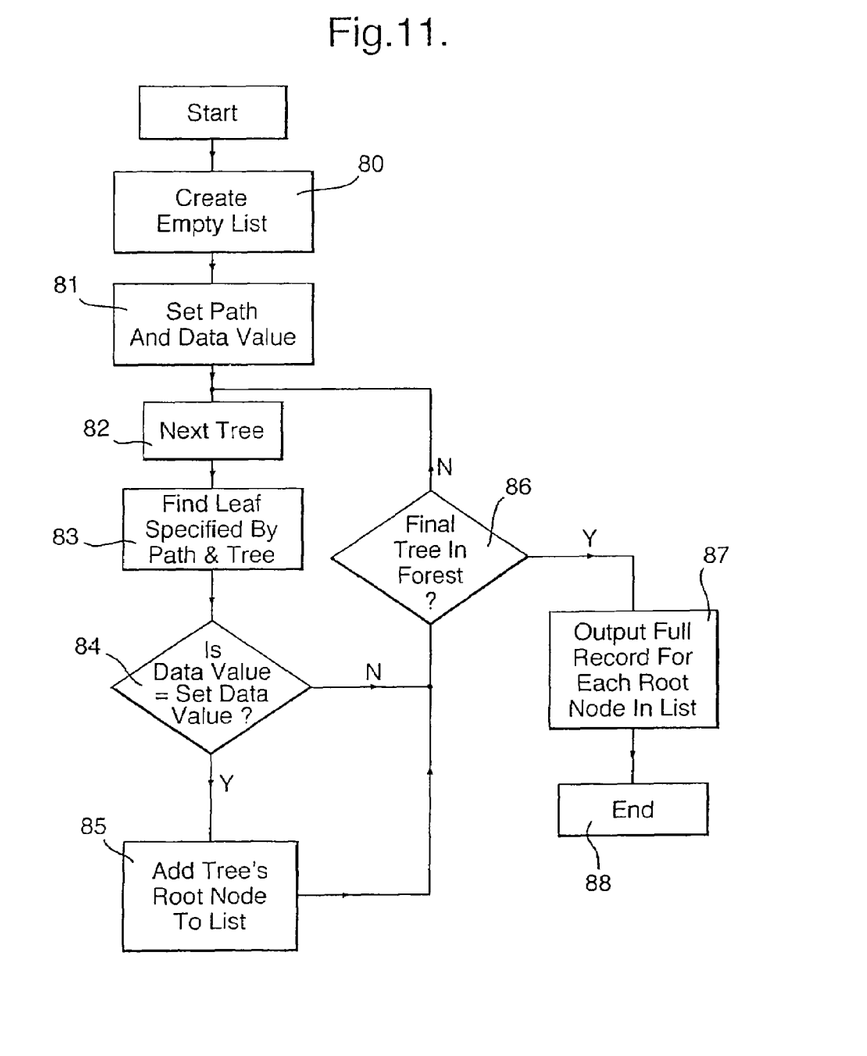

The present embodiment of the invention also comprises a function called "select", which outputs all records having a specified data value within a specified field. Referring now to FIG. 11, there is shown a flow chart illustrating execution of an algorithm which implements the select function. An empty list is first created in memory (80) for storing a list of root node addresses. A path corresponding to a particular type of data and a particular data value corresponding to that type are specified (81). The path is then applied to a binary tree within a forest (82). If the leaf of that binary tree specified by the path stores the specified data value (84), the root node address of that binary tree is added to the list, and the next tree in the forest is queried in a like manner. When all trees in the forest have been queried, records corresponding to all the root node addresses in the list are output (87) and the algorithm then ends (88). The select function may be modified to return records in which a specified field stores a data value which belongs to a specified set of data values. For example in the database illustrated in FIGS. 1 and 2, it may be required to find all records in which there is an insurance premium of £200 or more. To implement this, more than one data value may be specified at 81 in the algorithm shown in FIG. 11.

It may be required to make a more complex selection of records than that just described. For example, in the case of the database shown in FIGS. 1 and 2, it may be required to output all records in which the manufacturer field has a data value "Ford"® and the year field stores a data value of 1995 or greater. To achieve this functionality, a first path is used to generate a set of records in which a first field has a first data value. The set of records is then input to a sub-routine in which a second path is used to identify a sub-set of records in which a second field has a second data value, or any one of a series of second data values. Records satisfying two criteria may thus be identified.

Figure 12:
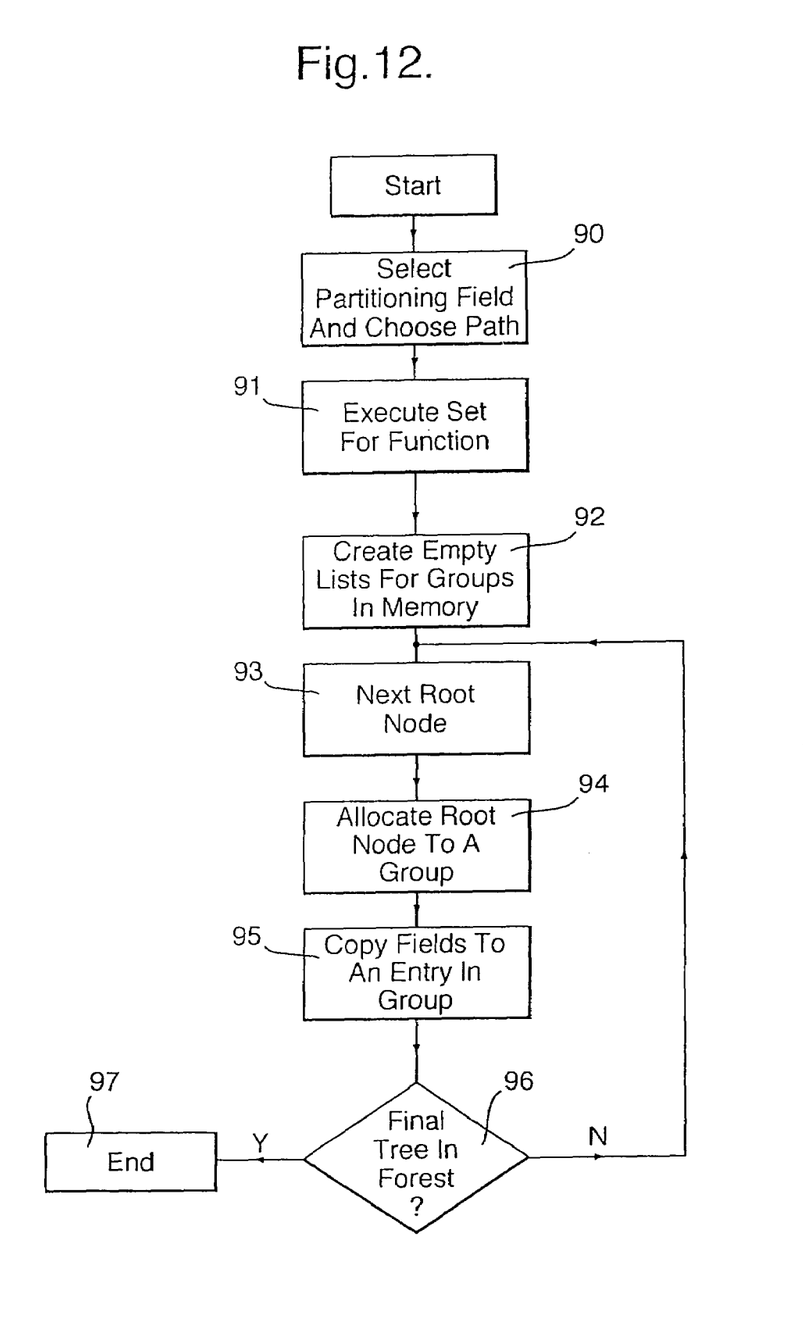

Referring now to FIG. 12, there is shown a flow chart illustrating an algorithm which partitions all records in a database into a set of groups, each group consisting of all records in which a specified field type has one of all the possible data values of that field. For example, the database illustrated in FIGS. 1 and 2 may be partitioned into two groups corresponding to the two possible manufacturer data values, "Ford"® and "Audi"®. A partitioning field is first chosen (90), that is, a field type the set of possible data values of which will define one or more groups of records into which the database will be resolved, and the corresponding path is specified. The set for function is then executed (91) in respect of that field type. The number of partitions will be equal to the number of entries in the list generated by the set for function. A corresponding number of initially empty tables are created in memory (92). An entries count in the list determines the amount of memory space taken up by that partition. A root node is then read (93) and the specified path used to find the data value stored at the corresponding leaf node. That data value is then used to assign the root node to one of the partitions, and fields of the corresponding record are written to an entry in the partition. Remaining root nodes and records are processed in a like manner until every record in the database has been analysed.

Figure 13:
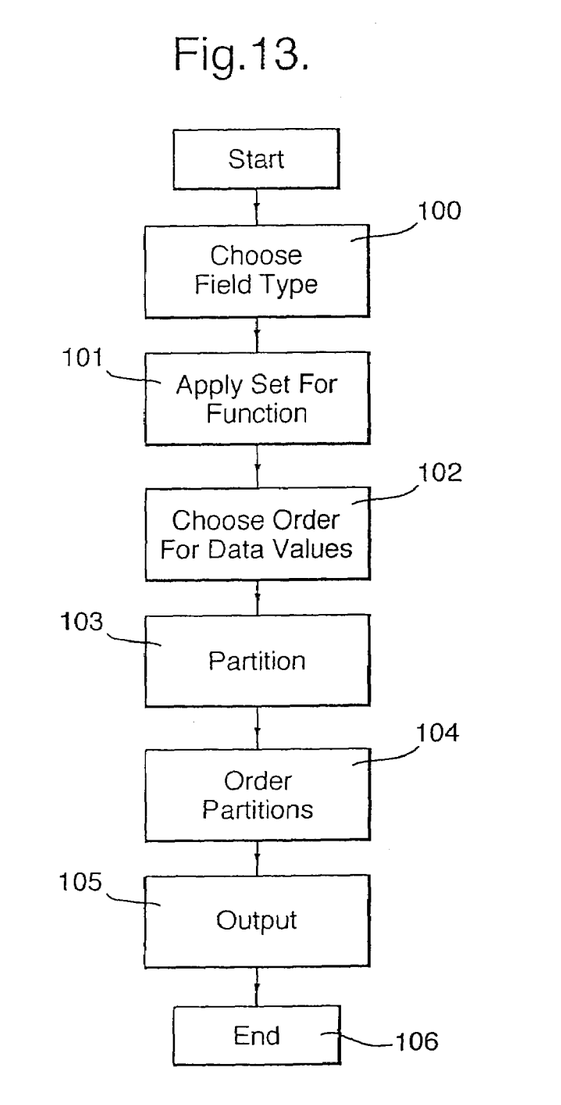

The present embodiment also includes a querying function called a sorting function which outputs all records in the database as a sorted list. The sorted list comprises a series of groups of records in which a chosen field type has a fixed data value. For example, the database represented by the table 10 in FIG. 1 and the forest 20 in FIG. 2 may be output as a list of records which first lists all records in which the manufacturer field has the data value "Ford"® and which then lists all records in which the manufacturer field has the data value "Audi"®. Referring now to FIG. 13, there is shown a flow chart illustrating execution of the sorting function. A field type for sorting records of the database is chosen (100) and the set for function is executed (101) to generate a list in memory of all possible data values that exist in respect of that field type and for each such data value, the number of records having the chosen field type set to that data value. A desired order for the set of all possible data values for the chosen field is specified (102); this fixes the order in which groups of records appear in output generated by the sorting function. The partition function is then executed (103) to partition records of the database into groups which are then ordered (104) according to the desired order of data value specified in 102. The ordered, or sorted, records are then output (105) and the algorithm ends (106).

In a conventional database system, the time taken to sort n records is proportional to $n\log_2 n$. However using the sorting function illustrated by the flowchart shown in FIG. 13, the time required to sort a database is proportional to $m\log_2 m + 2n$, where n is the number of records and m is the total number of possible data values for the chosen field. In most data m is small compared to n, so that the time required to sort a database according to the present invention grows only linearly with the number of records when n is very much greater than m, compared to more than linearly in the case of a conventional database.

The description above relates to a very simple database comprising only three records, each of which has only four fields. However, querying methods of the invention may be applied to data stored in the form much more complex forests of binary trees. For example, a given binary tree of a forest may comprise intermediate nodes each of which stores the addresses of one or two other intermediates nodes rather than addresses of leaf nodes.

Embodiments of the invention may be implemented by a computer program running on any general purpose computer in commonly used languages such as C and Java®.

The searching functions illustrated in FIGS. 8 to 13 may be implemented by means including a graphical user interface (GUI) which allows a user to construct queries graphically on a visual display unit without the need for writing program code. This is referred to in the art of computers as "visual programming" a user defines a computer program by manipulating and concatenating graphical elements (icons) upon the GUI to form the required programming functions. For example when carrying out the select function on the database shown in FIGS. 1 and 2, a suer may specify a field type (e.g. 'premium'), an operator (e.g. "≧") and data value (e.g. "£300") by means of menus provided by the GUI in order to select a subset of records in which the premium is greater than £300 for example. The subject of records corresponding to that field type operator and data value could then be displayed by the GUI. Further processing of the subset may be also be carried out using graphical elements which correspond to functions which operate on data in the subset. For example it may be required to sum premium values in the subset and calculate an average premium for the subset. Such calculations may be effected by manipulating graphical elements on a visual display unit which correspond to summing and averaging functions, avoiding the need to write program code to carry out such functions.

The invention claimed is:

1. A method of querying a data structure which comprises a plurality of records, each record comprising a plurality of nodes structured as a binary tree, wherein the method comprises the steps of
   (i) creating an instruction set for accessing a data value stored at a leaf node of a binary tree by:
      (a) determining the leaf node's position address within a binary tree to which the node belongs;
      (b) establishing the leaf node's lateral position index;
      (c) entering an instruction in an instruction set, the instruction depending on the node's lateral position index; and
   (ii) retrieving a data value stored at a leaf node of a binary tree using the instruction set and the binary tree's root node position address.

2. A method according to claim 1 further comprising the steps of:
  (a) specifying a binary tree;
  (b) specifying a instruction set;
  (c) reading a data value stored within the binary tree at a node position address corresponding to the instruction set;
  (d) adding the data value to a list in memory with a count of one if it has not previously been found within a binary tree or alternatively advancing a count variable in the list associated with that data value by one if the data value has previously been found within a binary tree; and
  (e) repeating steps (a) to (d) for remaining binary trees in the data structure.

3. A method according to claim 2 further comprising the steps of:
  (a) creating a table in memory for each data value in the list;
  (b) reading a data value of a binary tree, the data value corresponding to the specified instruction set; and
  (c) assigning the binary tree's root node address to a table depending on the data value corresponding to the specified instruction set; and
  (d) repeating steps (b) and (c) for remaining binary trees in the data structure.

4. A method according to claim 3 further comprising the steps of:
  (a) specifying an order for the data values in the list; and
  (b) arranging the tables in an order corresponding to the order of the data values.

5. A method according to claim 1 further comprising the steps of:
  (a) specifying a data value;
  (b) determining the data value within a binary tree corresponding to the instruction set;
  (c) establishing whether the data value determined in step (b) is equal to the specified data value, and if so adding the record corresponding to the binary tree to a list in memory;
  (d) repeating steps (a) to (c) for remaining binary trees.

6. A method according to claim 1 wherein the steps of the method are implemented by arranging graphical elements in a graphical user interface.

7. A computer program for carrying out the method of claim 1.

8. A computer program product storing a program for carrying out the method of claim 1.

9. A computer system arranged to carry out the method of claim 1.

* * * * *